United States Patent [19]
Kopp

[11] 3,737,850
[45] June 5, 1973

[54] VEHICLE SAFETY BELT SENSOR SYSTEM

[76] Inventor: Richard F. Kopp, 308 Morse Drive, Northlake, Ill. 60164

[22] Filed: Feb. 10, 1972

[21] Appl. No.: 225,208

[52] U.S. Cl..............340/52 E, 340/278, 307/10 SB, 180/82 C
[51] Int. Cl..............................................B60r 21/00
[58] Field of Search................340/52 R, 52 E, 52 D, 340/278; 307/10 SB; 180/82 C

[56] References Cited
UNITED STATES PATENTS 3,340,523  9/1967  Whitman..............................340/278
3,215,221  11/1965  Rayman..........................340/278 UX
3,226,674  12/1965  Eriksson..........................340/278 X

*Primary Examiner*—Alvin H. Waring
*Attorney*—R. F. Van Epps

[57] ABSTRACT

A vehicle safety belt sensor system whereby the presence of an occupant in a vehicle seating position is sensed and used as a criterion for preventing the operation of the vehicle when a seat belt or harness at the occupied position is nto in actual use.

6 Claims, 2 Drawing Figures

Patented June 5, 1973

3,737,850

VEHICLE SAFETY BELT SENSOR SYSTEM

BACKGROUND OF THE INVENTION

1. Field of the Invention

The present invention relates generally to the field of vehicle safety devices and more particularly to a new and improved system for use with vehicle safety belts or harnesses to insure the actual use thereof by occupants of the vehicle.

2. Description of the Prior Art

In an effort to promote vehicle safety new vehicles produced in recent years have been provided with passenger restraining means including safety belts and/or harnesses as standard equipment. Although the basic means for reducing injury and fatalities has thus been provided there has remained a significant problem in assuring that these safety devices are actually used by the vehicle occupants.

Prior to the present invention some vehicles have been provided with warning indicia which are actuated whenever all seat belts in the vehicle are not fastened when the ignition is switched on. Although such devices do at least provide some warning to the operator of the vehicle there are several problems with the prior art approach which heretofore have remained unsolved. First, the prior warning systems do not discriminate between occupied and unoccupied seating positions in the vehicle. Thus when the vehicle ignition is switched on the warning indicia is actuated whenever any safety belt is not fastened. Under such circumstances an operator of the vehicle eventually becomes conditioned to ignoring the warning indicia or may simply fasten all seat belts or harnesses in the vehicle whether they are in actual use or not. A second problem arises in that the indicia of the prior warning systems are typcially extinguished after some selected period of time after the vehicle engine has been started regardless of whether the seat belts have been fastened or not. These shortcomings of the prior art seat belt warning devices significantly contribute to the ease with which an operator of the vehicle may become conditioned to ignore the warning indicia, fail to be assured that all occupants of the vehicle are safely fastened in their seats and thus completely defeat the purpose for which the seat belts and harnesses were provided.

OBJECTS AND SUMMARY OF THE INVENTION

From the foregoing discussion it will be understood that among the various objectives of the present invention are included the following:

the provision of a new and improved vehicle safety belt sensor system for indicating the failure of an occupant of the vehicle to fasten a safety belt or harness;

the provision of apparatus of the above-described character which prevents operation of the vehicle until each occupant has fastened the safety belt or harness at his seating position in the vehicle;

the provision of aparatus of the above-described character which discriminates between occupied and unoccupied seating positions in the vehicle;

the provision of apparatus of the above-described character which produces a persistent warning when a safety belt or harness at an occupied position is unfastened while the vehicle is in operation; and the provision of apparatus of the above-described character which is operative if the seat belt or harness at an occupied seating position is fastened without actually being used by the occupant.

These as well as other objectives of the present invention are efficiently achieved by providing each seating position of a vehicle with means for sensing the presence of an occupant at that position. Each seat belt or harness is provided with an electrical conductor which, when the belt or harness is fastened, completes a circuit bypassing the sensing means at that seating position. The sensors and belt circuits are coupled via relays to the vehicle ignition system, starter, the starting voltage source, transmission selector and a warning system to preclude starting the vehicle engine when any seat belt or harness at an occupied seating position is not in actual use and to actuate an alarm when any such belt or harness is unfastened while the vehicle is in operation.

The foregoing as well as other objects, features and advantages of the present invention will become more apparent from the following detailed description taken in conjunction with the appended drawings.

DESCRIPTION OF THE PREFERRED EMBODIMENT

Figure 1:
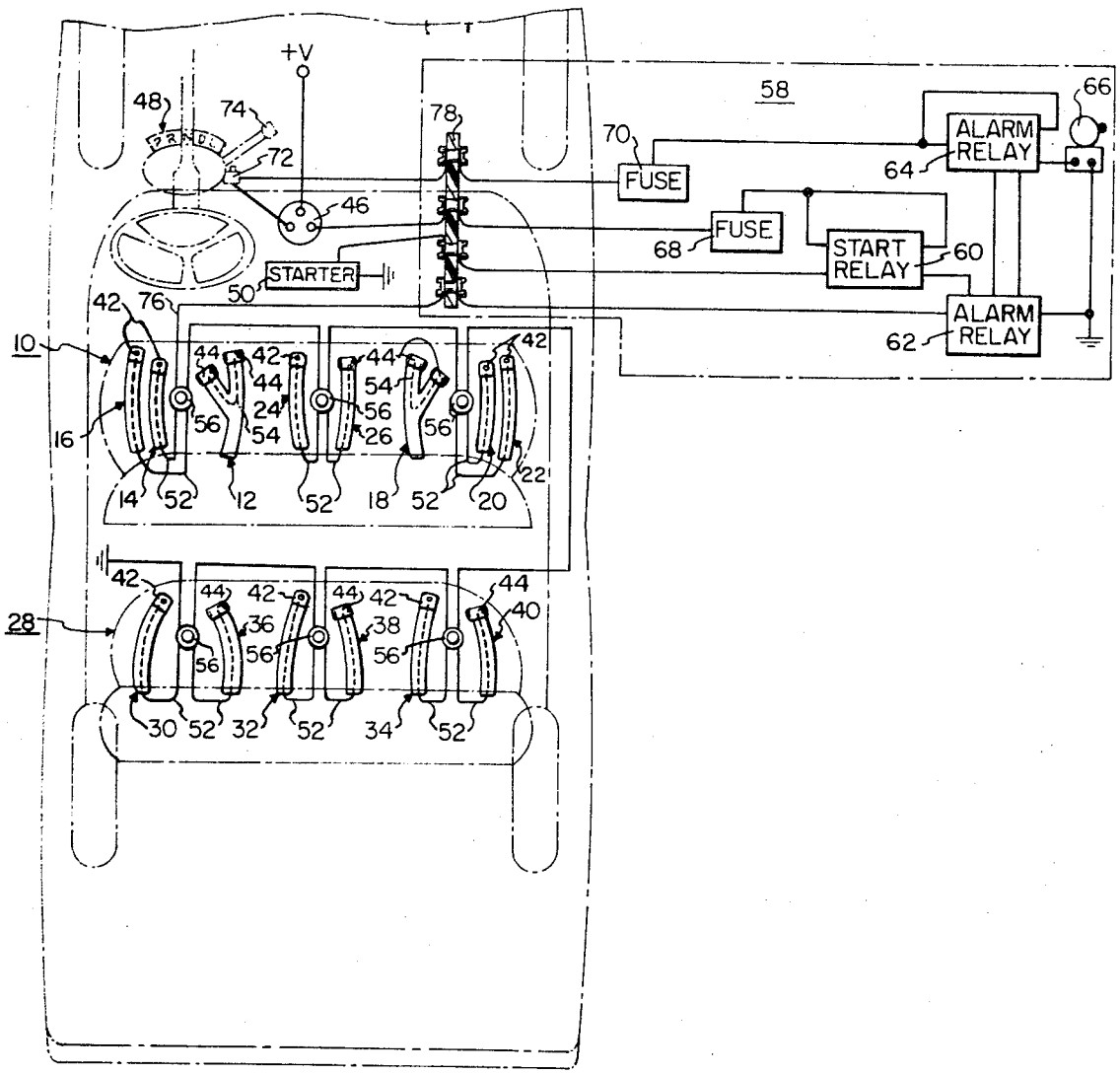
FIG. 1 is a schematic block diagram of a vehicle safety belt sensor system constructed in accordance with the principles of the present invention.

Turning now to FIG. 1 there is shown an embodiment of the present invention as it would be incorporated in a conventional six passenger vehicle. Typically the front seat 10 of the vehicle is provided with a two way buckle portion 12, a lap belt 14 and shoulder harness 16 at the operator position, a buckle portion 18, lap belt 20 and shoulder harness 22 at the outer front passenger position and a lap belt 24 and buckle portion 26 at the center passenger position. The rear seat 28 is provided with lap belts 30, 32 and 34 and buckle portions 36, 38 and 40 at the three rear passenger positions respectively. Each lap belt and harness is provided with a metallic end portion 42 which is adapted to engage the metallic buckles 44 at the ends of the buckle portions of the belts. Other conventional elements of the vehicle with which the apparatus of the present invention cooperates include the ignition switch 46, transmission selector unit 48 and the engine starter unit 50. The vehicle battery is schematically illustrated as a positive voltage, +V, typically 12vdc.

In the practice of the present invention each lap belt 14, 20, 24, 30, 32 and 34 as well as each shoulder harness 16 and 22 are provided with an electrical conductor 52 in electrical continuity with the metal end portions 42 thereof. Each buckle portion is similarly provided with an electrical conductor in electrical continuity with the metal buckles 44 thereof. The two way buckle portions 12 and 18 at the operator and outer front passenger positions respectively are provided with an electrical conductor 54 which electrically couples the two buckles. It will be understood that the electrical conductors 52 may be woven directly into the belt fabric, stitched into existing belts or otherwise disposed in or on the belt fabric in any convenient manner such as to move freely with the belt fabric. The conductors may be soldered to the metal end portions 42 and buckles 44 or fixed thereto in any fashion which will provide reliable electrical continuity. The electrical conductor arrangement through the belt, harness and buckle portions at each seating position will hereinafter be referred to as a belt circuit. It will be noted that the belt circuits are disposed at the ground potential side of the starter relay 60 thus eliminating any electrical hazard from elements of the system with which any of the vehicle occupants may come into contact.

Coupled in parallel with the belt circuit at each seating position is means 56 for sensing whether that seating position is occupied. A sensory means which has been found by the Applicant to be of particular utility in the practice of his invention is a conventional microswitch having normally closed contacts. These switches may conveniently be mounted beneath the front and rear seats 10 and 28 such that the weight of an occupant at any given seating position operates to open the contacts of the switch at that position. Although the microswitch type of sensor is preferred it will be apparent that any of a variety of alternative sensors may also be employed to interrupt a parallel circuit at each seating position which is occupied.

With the foregoing construction it will be seen that each seating position is provided with first and second parallel electrical circuits which are coupled at one side to ground potential and at the other to belt sensor circuitry 58 to be presently described. It will further be understood that when a given seating position is occupied while the lap belt and harness at that position is unfastened the electrical circuit path between the sensor circuitry 58 and ground potential is open. If a given seating position is not occupied, however, there is an electrical path through the sensing means 56 at that position. If the seating position is occupied the sensing means is rendered non-conductive and the electrical path may only be provided through the belt circuit at that position.

The belt sensor circuitry 58 may be conveniently packaged as a single unit for mounting beneath the vehicle dashboard and includes a starter relay 60 having normally open contacts, a first alarm relay 62 having both make and break contacts and a second alarm relay 64 having normally closed contacts. Also provided is an alarm 66 such as a bell or buzzer as well as first and second electrical fuses 68 and 70. The final element of the vehicle safety belt sensor system of the present invention is a normally open microswitch 72 affixed to the transmission selector unit 48 such that the contacts thereof are closed when the gear selector handle 74 is placed in the vehicle operating position.

The parallel coupled belt circuits and sensing means 56 are coupled between ground potential and via lead 76 to an input terminal on the connector block 78 of the belt sensor circuitry 58. In like fashion the ignition switch 46, transmission selector sensor 72 and vehicle starter are coupled to the terminals of the connector block 78.

Figure 2:
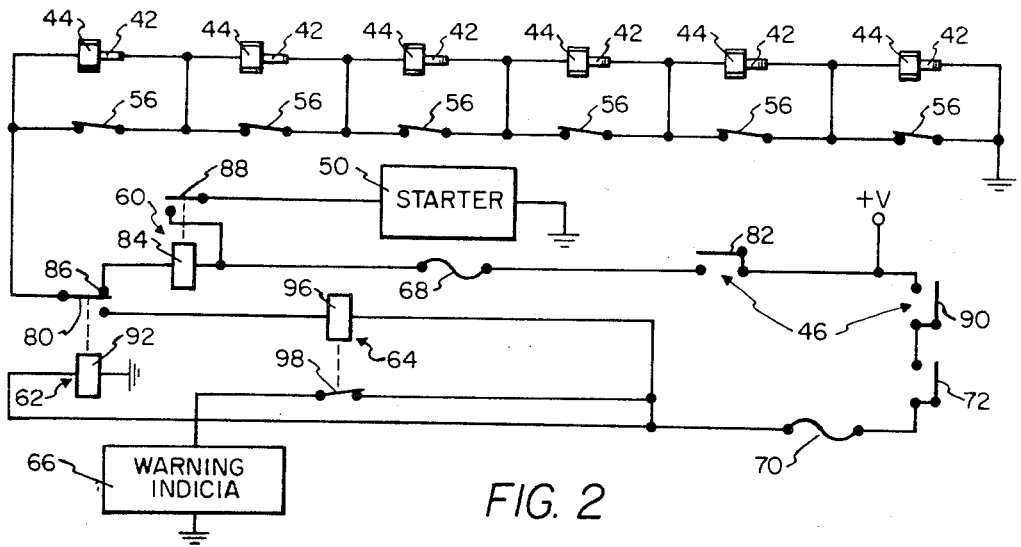
FIG. 2 is a more detailed electrical schematic diagram of the appratus of FIG. 1.

The manner in which the elements of the present invention are electrically coupled to and cooperate with the conventional vehicle elements will be better understood through reference to the schematic electrical diagram of FIG. 2. The elements illustrated in FIG. 2 which are common to those shown in FIG. 1 are identified by like reference numerals.

In FIG. 2 the belt circuits are schematically shown as the metal buckle 44 and belt end portions 42 and are simplified for the purposes of illustration by deletion of the harness portions 16 and 22 as well as the second buckle portions of the two way belt units shown in FIG. 1. The sensing means at each seating position in the vehicle are schematically shown as the normally closed contacts of switches 56. The belt circuits and switches 56 are coupled in parallel at one end to ground potential and at the other to the armature 80 of the first alarm relay 62. Assuming that the belt circuits at all occupied positions in the vehicle are properly closed the operation of the vehicle ignition switch 46 couples the starting voltage, +V, through the starter solenoid contacts 82, and fuse 68 to the winding 84 of relay 60. Since an electrical path is complete through winding 84, break contact 86, armature 80, and either the belt circuits or switches 56 to ground, the starter relay 60 operates to close its contacts 88 and complete the circuit to the vehicle starter 50. It will be noted, however, that if the belt circuit at an occupied position were open, relay 60 could not be operated and the starting voltage could not be applied to the vehicle starter 50.

Once the vehicle is started the voltage, +V, is coupled through the ignition coil contacts 90 of ignition switch 46 to one side of the transmission selector unit switch 72. When the gear selection lever 72 (FIG. 1) is placed in the operating position; e.g., Drive, the contacts of switch 72 are closed applying the voltage, +V, through fuse 70 to the winding 92 of relay 62. The armature 80 is thus pulled into contact with the make contact 94 and +V is coupled to the winding 96 of relay 64. So long as all belt circuits at occupied seating positions in the vehicle are properly fastened current flows through the winding 96 of relay 64 and the armature 98 thereof is pulled up preventing the application of the voltage, +V, to the warning indicia 66 such as the alarm illustrated in FIG. 1. Thus, should any belt circuit at an occupied position be opened when the vehicle is in operation the armature 98 of relay 64 returns to its normally closed position and the voltage, +V, is coupled to the alarm 66. The alarm 66 will remain actuated until either the open safety belt is fastened or the vehicle tramsmission selector 48 is moved out the the vehicle operating position.

It has been found by the Applicant that in actual practice the electrical path through the belt circuits; i.e., between the metal belt end portions 42 and buckles 44 is reliably maintained only when the belt or harness is securely fastened around an occupant as is recommended for proper use. When a belt or harness is only loosely fastened about the occupant or is simply fastened without even being placed about the occupant the belt circuit is intermittently opened by normal vehicle vibrations, road shock and normal movement of the occupant. Thus if by employing an audible warning alarm 66 which is on an irritating frequency even the most reluctant operator of the vehicle may be effectively urged to assure that all occupants of the vehicle actually use the safety belts and harnesses in the proper manner.

From the preceding description it will be seen that the applicant has provided a new and novel vehicle safety belt sensor system whereby the deficiencies in the prior art are overcome and the objectives set forth hereinabove are efficiently achieved. Since certain changes in the above-described construction will occur to those skilled in the art without departure from the scope of the invention it is intended that all matter set forth in the description or shown in the appended drawings shall be interpreted as illustrative and not in a limiting sense.

Having described what is new and novel and desired to secure by Letters Patent, what is claimed is:

1. A vehicle safety system for use in cooperation with a vehicle having passenger restraining means, an ignition switch, a starter, a source of starting voltage, and a vehicle operation selector means, said system comprising an electrical belt circuit associated with the passenger restraining means at each seating position in said vehicle, and being electrically conductive only when said restraining means is fastened about an occupant of said seating position;

means coupled in parallel with each said belt circuit for sensing the presence of an occupant of said seating position, being normally electrically conductive, and being electrically non-conductive when said seating position is occupied;

an alarm;

means for sensing the operation of said vehicle;

a sensor circuit including a first alarm relay having a break contact coupled to said alarm, an armature coupled to said operation sensing means, and a winding coupled at one side to said operation sensing means, and a second alarm relay having a make contact coupled to the winding of said first alarm relay, an armature coupled in parallel to said belt circuit and said occupant sensing means, and a winding coupled to said operation sensing means; and said operation sensing means coupling said starting voltage source to the winding of said first and second alarm relays and to the armature of said first alarm relay, said second alarm relay operative in response to the coupling of said starting voltage source to the winding thereof to couple said starting voltage through the winding of said first alarm relay in parallel to said belt circuit and said occupant sensing means, and said first alarm relay operative in response to the coupling of said starting voltage to the winding thereof to hold the armature thereof apart from the break contact thereof;

whereby opening of said belt circuit at an occupied seating position while said vehicle is in operation releases said first alarm relay thereby coupling said starting voltage source to said alarm and indicating the existence of an open belt circuit at any occupied seating position in said vehicle.

2. A system as recited in claim 1 wherein said electrical belt circuit is electrically conductive only when said restraining means is fastened under tension.

3. A system as recited in claim 1 wherein
   said occupant sensing means comprises a switch having normally closed electrical contacts coupled in parallel with each said belt circuit at each seating position, being affixed to each seating position in said vehicle, and responsive to the pressure of an occupant of said seating position to open said contacts.

4. A system as recited in claim 1 wherein
   said alarm is an audible alarm.

5. A system as recited in claim 1 wherein
   said operation sensing means comprises a switch having normally open contacts, affixed with respect to said vehicle operation selector means such that operation of said selector means closes said contacts to thereby couple said sensor circuit to said starting voltage source.

6. A system as recited in claim 1 further including
   a break contact in said second alarm relay,
   a starter relay having a winding coupled between said second alarm relay break contact and said ignition switch, a make contact coupled to said starting voltage source, an armature coupled to said starter, and operative to couple said starting voltage to said starter only when said ignition switch is closed and said belt circuit at an occupied seating position is electrically conductive.

* * * * *